United States Patent
Mehta et al.

(10) Patent No.: US 8,103,544 B2
(45) Date of Patent: Jan. 24, 2012

(54) COMPETITIVE ADVERTISING SERVER

(75) Inventors: Bhavesh R. Mehta, Cupertino, CA (US); Anurag Agarwal, Sunnyvale, CA (US); Nandakumar Ramani, Milpitas, CA (US); Kai Chen, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 527 days.

(21) Appl. No.: 12/195,688

(22) Filed: Aug. 21, 2008

(65) Prior Publication Data

US 2010/0049584 A1 Feb. 25, 2010

(51) Int. Cl.
*G06Q 30/00* (2006.01)

(52) U.S. Cl. .......... 705/14.42; 705/14.4; 705/14.41; 705/14.43; 705/14.45

(58) Field of Classification Search .......... 705/14.4, 705/14.42, 14.43, 14.46; 707/14.41
See application file for complete search history.

(56) References Cited

U.S. PATENT DOCUMENTS

| | | | |
|---|---|---|---|
| 6,636,590 B1 | 10/2003 | Jacob et al. | |
| 6,704,403 B2 | 3/2004 | Lurie et al. | |
| 6,801,899 B2 | 10/2004 | Lauffer | |
| 6,865,540 B1 | 3/2005 | Faber et al. | |
| 2004/0193488 A1 | 9/2004 | Khoo et al. | |
| 2004/0267612 A1 | 12/2004 | Veach | |
| 2005/0137939 A1* | 6/2005 | Calabria et al. | 705/26 |
| 2005/0138550 A1 | 6/2005 | Dermler et al. | |
| 2005/0203796 A1* | 9/2005 | Anand et al. | 705/14 |
| 2006/0184417 A1* | 8/2006 | Van der Linden et al. | 705/14 |
| 2006/0282328 A1* | 12/2006 | Gerace et al. | 705/14 |
| 2007/0192194 A1* | 8/2007 | O'Donnell et al. | 705/14 |
| 2008/0103896 A1* | 5/2008 | Flake et al. | 705/14 |
| 2008/0103969 A1* | 5/2008 | Flake et al. | 705/39 |
| 2008/0294577 A1* | 11/2008 | Agarwal | 706/12 |
| 2009/0327028 A1* | 12/2009 | Collins | 705/10 |
| 2010/0088321 A1* | 4/2010 | Solomon et al. | 707/749 |

FOREIGN PATENT DOCUMENTS

| | | | |
|---|---|---|---|
| KR | 10-2001-0102800 A | | 11/2001 |
| KR | 20050135676 | * | 8/2007 |
| WO | 02/101587 A1 | | 12/2002 |

OTHER PUBLICATIONS

Notification of Transmittal of the International Search Report and the Written Opinion of the International Searching Authority, or the Declaration, PCT/US2009/054037, Mar. 16, 2010, 11 pages.

* cited by examiner

*Primary Examiner* — John Weiss
*Assistant Examiner* — Krishan Mittal
(74) *Attorney, Agent, or Firm* — Fish & Richardson P.C.

(57) ABSTRACT

Competitive content item serving is provided. Competitive content item serving can include the ability to receive a request for a content item and to compare an expected return for a first network content item to an expected return for a second network content item. Based upon the comparison, it can be determined whether to provide the first network content item to the publisher.

22 Claims, 5 Drawing Sheets

COMPETITIVE ADVERTISING SERVER

BACKGROUND

This document relates to content delivery.

The Internet enables access to a wide variety of content items, e.g., video and/or audio files, web pages for particular subjects, and news articles. Such access to these content items has likewise enabled opportunities for targeted advertising. For example, content items of particular interest to a user can be identified by an advertising server and syndicated to a publisher, thereby allowing advertisers to extend their marketing reach by distributing advertisements to additional partners. For example, third-party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

Publishers of content can also be compensated for the advertising space provided for the advertisement. However, there exist many disparate advertising services with different pricing structures, making it difficult for publishers to determine whether they are being compensated adequately for the advertising space sold to advertisers.

SUMMARY

In general, the subject matter of this application relates to content delivery. One aspect of the subject matter described in this specification can be embodied in a method that includes the actions of receiving a request for a media item (e.g., advertisement), the request being associated with a publisher; determining whether a first expected return on a first content generation system (e.g., first network advertisement system) is greater than or equal to a second expected return on a second content generation system (e.g., a second different content network advertisement system); and if the first expected return is greater than or equal to the second expected return, providing a content item from the first content generation system to the publisher. Other embodiments of this aspect include corresponding methods, apparatuses, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Competitive advertising servers can operate to maximize advertising revenue for publishers by comparing expected return for advertising inventory associated with a first advertising system or service (e.g., server) to the expected return for advertising inventory associated with a second advertising system or service (e.g. a second different server). In some implementations, the first advertising server can be associated with the competitive advertising server and the second advertising server can be a third-party advertising server. In additional implementations, the expected return for advertising inventory associated with the second advertising server can be provided by the publisher. In other implementations, the expected return for advertising inventory associated with the second advertising server can be retrieved directly from the second advertising server. The expected return for advertising inventory associated with the first advertising server can be estimated, for example, based upon a click through rate (CTR) associated with the various instances of advertising inventory. While reference is made to delivering advertising, other forms of content can be delivered competitively.

Figure 1:
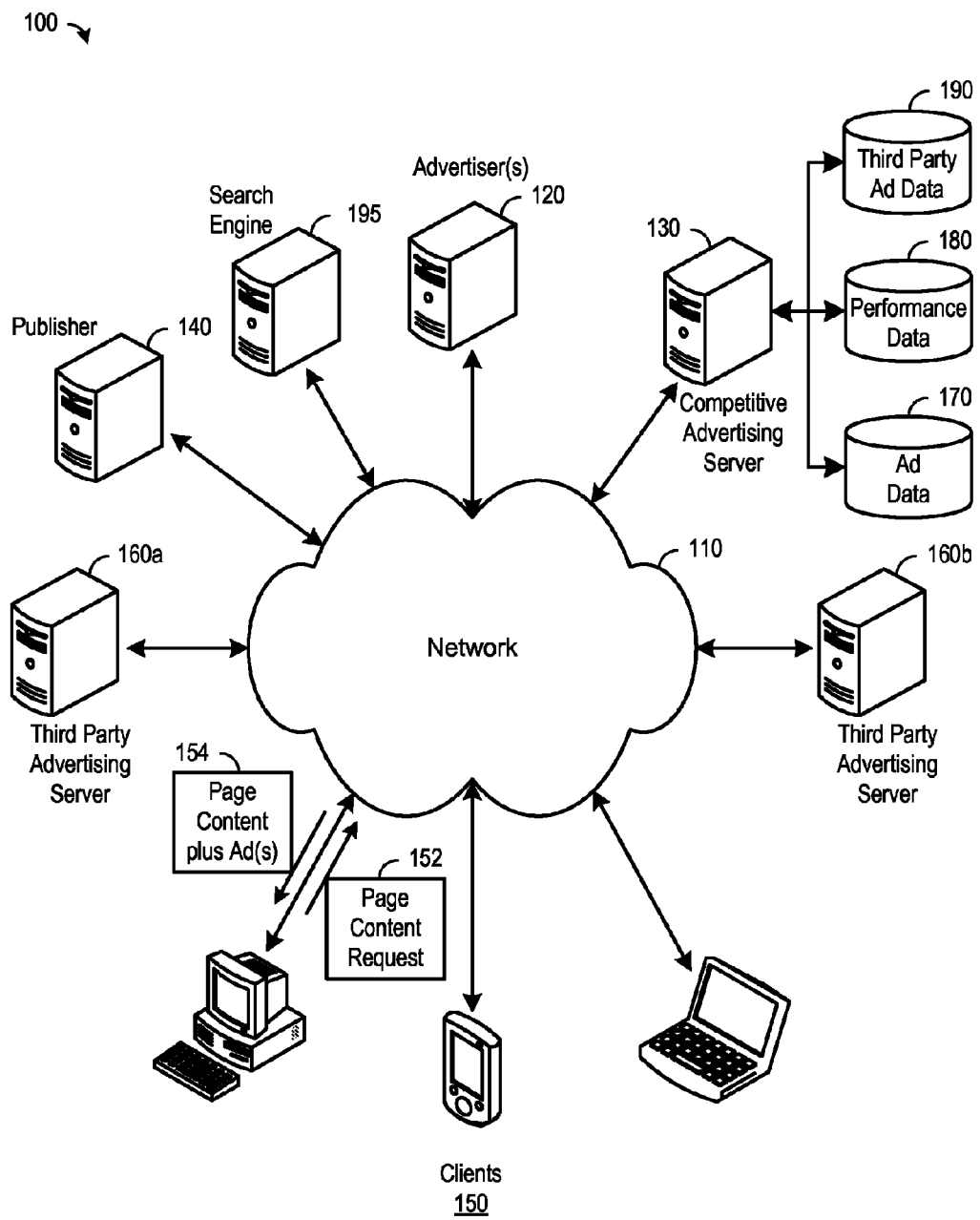
FIG. 1 is a block diagram of an example online advertising environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects an advertiser 120, a competitive advertisement server 130, a publisher 140, and user devices 150. The online environment can also include third-part advertising servers 160*a*, 160*b*. Although only a single advertiser (120), publisher (140), two third-party advertising servers (160*a* and 160*b*), and a few user devices (150) are shown, the online environment 100 may include many thousands of advertisers, publishers, and user devices. Moreover, there can also include multiple competitive advertising servers (130) and many third-party advertising servers (160*a* and 160*b*)

In some implementations, one or more advertisers 120 can directly, or indirectly, enter, maintain, and track advertisement information in the competitive advertisement server 130. The advertisements can be in the form of graphical advertisements, such as banner advertisements, text only advertisements, image advertisements, audio advertisements, video advertisements, advertisements combining one or more of any of such components, etc., or any other type of electronic advertisement document. The advertisements may also include embedded information, such as a links, meta-information, and/or machine executable instructions, such as HTML or JavaScript™.

A user device, such as user device 150, can submit a content request 152 (e.g., a page content request) to a publisher. Reference will be made to an on-line example, where a page request is received for providing content of a publisher and advertising by one of a plurality of advertising services. Alternatively, other forms of media (print, radio, television, etc) can be the form of distribution and other forms of content (e.g., other than advertising) are possible. In some implementations, page content 154 can be provided to the user device 150 in response to the content request 152. The page content 154 can include advertisements provided by the competitive advertisement server 130 or the third-party advertising servers 160*a*, 160*b*, or can include executable instructions, e.g., JavaScript™, that can be executed at the user device 150 to request advertisements from the respective advertisement server. Example user devices 150 include personal computers, portable electronic devices, radios, televisions, mobile communication devices, television set-top boxes, etc.

Advertisements can also be provided to the publishers 140. For example, one or more publishers 140 can submit advertisement requests for one or more advertisements to the competitive advertising server 130. The competitive advertising server 130 responds by sending the advertisements to the requesting publisher 140 for placement on one or more of the publisher's web properties (e.g., websites and other network-distributed content). The advertisements can include embedding links landing pages, e.g., pages on the advertisers 120 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 140 can combine the requested content with one or more of the advertisements provided by the competitive advertising server 130 or third-party advertising servers 160a, 160b. Such combined page content and advertisements 154 can be sent to the user device 150 that requested the content (e.g., user device 150) as page content 154 for presentation in a viewer (e.g., a browser or other content presentation system). The publisher 140 can transmit information about the advertisements back to the competitive advertisement server 130 or third-party advertising servers 160a, 160b, including information describing how, when, and/or where the advertisements are to be rendered (e.g., in HTML or JavaScript™).

Publishers 140 can include general content servers that receive requests for content (e.g., articles, discussion threads, music, video, graphics, search results, web page listings, information feeds, etc.), and retrieves the requested content in response to the request. For example, content servers related news content providers, retailers, independent blogs, social network sites, or any other entity that provides content over the network 110 can be a publisher 140.

In some implementations, advertisements can also be provided through the use of the search engine 195. The search engine 195 can receive queries for search results. In response, the search engine 195 can retrieve relevant search results from an index of documents (e.g., from an index of web pages). An exemplary search engine 195 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 195 can also submit a request for advertisements to the competitive advertising server 130 or third-party advertising servers 160a, 160b. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 195 can combine the search results with one or more of the advertisements provided by the competitive advertising server 130 or third-party advertising servers 160a, 160b. This combined information can then be forwarded to the user device 150 that requested the content as, for example, the page content 154. The search results can be maintained as distinct from the advertisements, so as not to confuse the user between paid advertisements and presumably neutral search results.

The advertisers 120, user devices 150, and/or the search engine 195 can also provide usage information to the competitive advertising server 130 or third-party advertising servers 160a, 160b. Such usage information can include measured or observed user behavior related to advertisements that have been served, such as, for example, whether or not a conversion or a selection related to an advertisement has occurred. The competitive advertising server 130 can perform financial transactions, such as crediting the publishers 140 and charging the advertisers 120 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the competitive advertising server 130. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

Advertisements and associated usage data can be stored as advertisement data in an advertisement data store 170. In some implementations, an advertiser 120 can further manage the serving of advertisement by specifying an advertising campaign. The advertising campaign can be stored in campaign data in a campaign data store (not shown) that can, for example, specify advertising budgets for advertisements, when, where and under what conditions particular advertisements may be served for presentation, etc. For example, a computer company may design an advertising campaign for a new laptop computer that is scheduled to be released in several weeks. The advertising campaign may have a budget of $500,000, and may have 30 different advertisements that are to be served for presentation during the month of November. Such data defining the advertisement campaign can be stored in the campaign data store.

In some implementations, the competitive advertising server 130 can be coupled to a performance data store 180. The competitive advertisement server 130 can provide performance data identifying how well the advertisement is performing to an advertiser and/or publisher. Identification of how well the ad is performing can be related to a performance metric. The performance metric can be defined, for example, in terms of the number of times it has been served, the number of conversions that have been recorded, or survey information about the advertisement from those viewers that have received the advertisement, among others.

The competitive advertising server 130 can also be coupled to an optional third-party ad information data store 190. The third-party ad information data store 190 can store information for the third-party advertisements with whom the publishers also request advertisements. In some implementations, an advertiser can specify a price or expected return that the advertiser is receiving from third-party provider(s) (e.g., third-party advertising server(s) 160*a*, 160*b*). In other implementations, the advertiser can provide information enabling the competitive advertising server to obtain a price or expected return directly from the third-party advertising server(s) 160*a*, 160*b*. Such information can be stored to the third-party ad information data store 190, and can be used to dynamically compare a current auction price with the price expected from third-party advertising servers 160*a*, 160*b* to maximize the value received by the publisher 140.

In some implementations, the performance data store 180 can also include demographic information about the types of users that visit a website associated with the placement. Such information can be identified, for example, through survey information. In other examples, such information can be inferred based upon, for example, internet navigation activities engaged in by the user. For example, profiles for various categories of users can be developed, and other users can be compared against the profile to determine the category with which the user is associated. However, personal information (e.g., including identification, address, IP address, etc.) for such users is not collected or used in profiling unless the user has opted in or otherwise agreed to such collection. While such information can aid in categorization, it is not typically collected in order to safeguard private information on behalf of users. Such information can also be useful in forecasting an expected return for the advertisement.

In some implementations, the competitive advertising server 130, upon receiving a request for an advertisement from the publisher 140, can determine whether an expected return on a first network advertisement (e.g., an in-network advertisement) is greater than an expected return on one or more second network advertisement (e.g., one or more out-of-network advertisement). First network advertisements can include those advertisements operable to be served by the competitive advertising server 130. Second network advertisements, for example, can include those advertisements operable to be served by third-party providers operating the third-party advertising servers 160*a*, 160*b*.

The competitive advertising server 130 can select a first network advertisement for providing to the publisher. The first network advertisement can be selected from a number of first network advertisements based upon relevance to a publisher 140. In some implementations, the first network advertisement can also be selected based upon a bid associated with the first network advertisement. The bid can be provided, for example, by the advertiser.

The expected return on the first network advertisement can describe a forecast amount expected to be paid to the publisher when the first network advertisement is served. In some implementations, the expected return can be calculated using a click through rate (CTR) associated with the first network advertisement by multiplying the CTR by a cost per click (CPC) bid for a highest bidding advertiser. The CTR can be a dynamic statistic that changes based upon updated performance information, e.g., retrieved from the performance database. The CTR can be determined, for example, by a machine-learning model, which can use a number of signals, such as a user's geographic location, language, country, time of day, etc. The machine-learning model can be trained based on prior performance data, rather than using a simple computation of prior CTR performance. Moreover, the CPC can vary based upon the auction used to identify the first network advertisement. In some implementations, the expected return for the first network can be calculated based upon a cost per mille (CPM) performance metric. In some implementations, an estimated CPM can be calculated based upon CTR and CPC for click based advertisements, and conversion rates (CVRs), cost per conversion (CPA), and CTR for conversion based advertisements.

The expected return on the second network advertisement can describe a forecast amount expected to be paid to the publisher when a second network advertisement is served. In some implementations, the expected return on a second network advertisement can be based upon a cost per mille (CPM) metric. The CPM metric pays a specified amount based upon a thousand exposures (e.g., views of the advertisement). In some examples, the publisher can provide the CPM data and the competitive advertising server 130 can store the information in a third-party ad information data store 190. Alternatively, the competitive advertising server 130 can retrieve the data directly from the third-party advertising servers 160*a*, 160*b*, e.g., using identification/authentication information provided by the publisher 140. In some implementations, the second network can use another performance metric for the second network advertisement, which can be the same as or different from the performance metric used for the first network advertisement.

In some implementations, if the first network advertisement delivers an expected return greater than or equal to the expected return of second network advertisements, the competitive advertising server 130 can provide the first network advertisement to the publisher 140. If the first network advertisement is determined to deliver an expected return less than the expected return from the second network advertisement, the competitive advertising server 130 instructs the publisher to retrieve an advertisement from a third-party provider through a third-party advertising server 160*a*, 160*b*. In other implementations, the competitive advertising server 130 can retrieve the second network advertisement and serve the second network advertisement to the publisher 140.

In those implementations where an estimated CPM is calculated from CTR and CPC for click based advertising, or CVR, CPA and CTR for conversion based advertising, the estimated CPM can be used as an expected return for comparison of the return from the first network advertisement and the expected return from the second network advertisement.

Figure 2A:
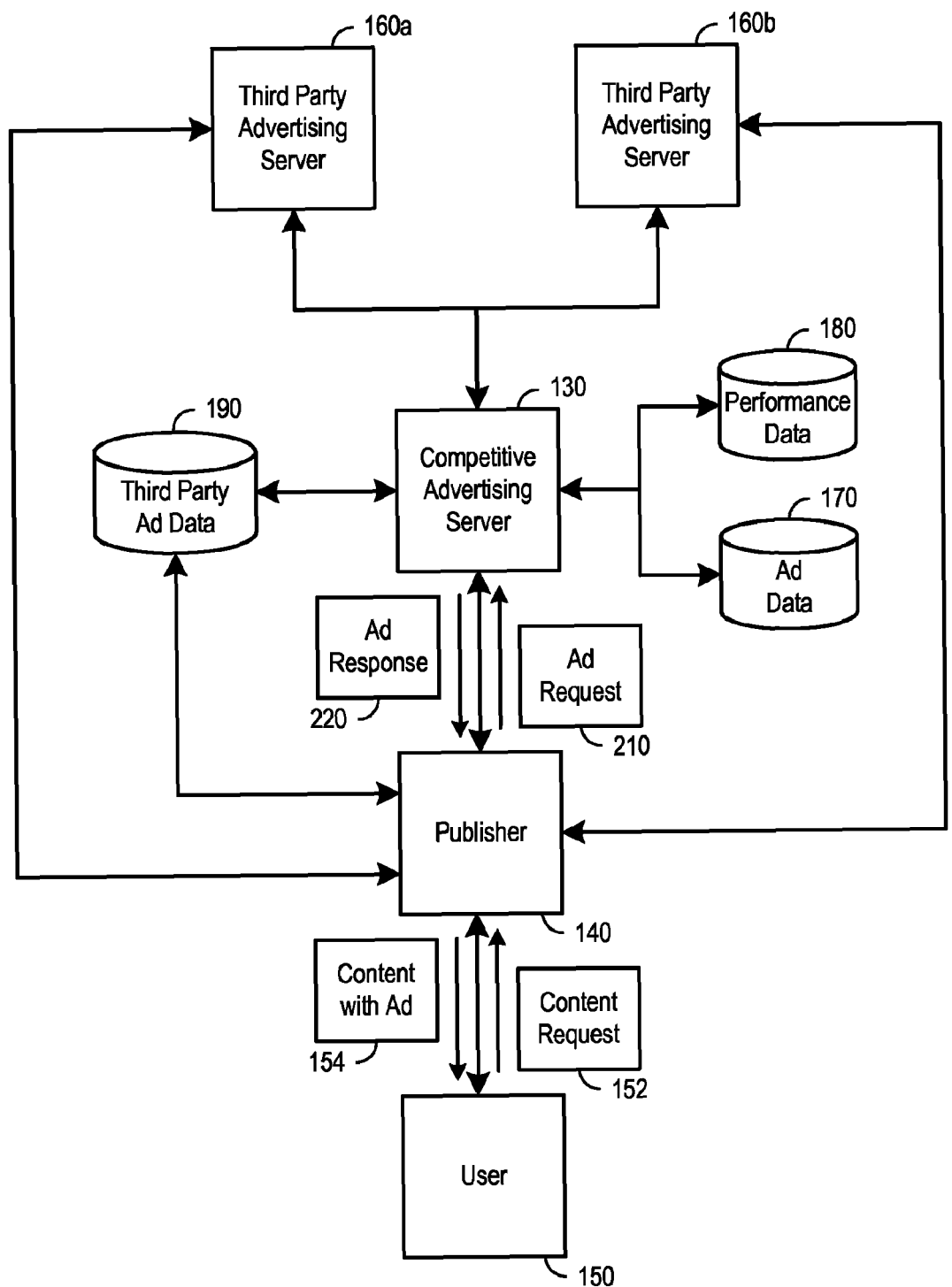
FIG. 2 is a block diagram illustrating the operation of an example competitive advertising server.

FIG. 2 is a block diagram illustrating the operation of an example competitive advertising server 130. The competitive advertising server 130 can receive requests for advertisements 210 from a publisher 140. In response to the request, the competitive advertising server 130 can identify the most relevant advertisements to the content provided by the publisher 140. The most relevant advertisements can be identified based upon the advertisements stored in an advertisement data store 170. Advertisements stored in the advertisement data store 170 can be referred to as first network advertisements (e.g., in-network advertisements).

In some implementations, the publisher 140 can provide a description of the content to the competitive advertising server 130, either off-line (e.g., the publisher can provide preferences), or in real-time. In some implementations, the competitive advertising server can compare the first network advertisements directly to the content to determine relevance of the advertisement to the content. The competitive advertising server 130 can also use a CTR (or another performance metric) to rank the first network advertisements based upon the expectation that advertisements with higher CTRs will result in more revenue for the publisher 140 and provide a better experience for the user.

Once relevant advertisements from the first network advertisements have been identified, the competitive advertising server 130 can select an advertisement. The selection can be made based on an automated auction to identify a highest bidder. In some implementations, the auction can take into account the bid CPC to identify a price the advertiser is willing to bid for the exposure. In some implementations, the auction can also take into account CTR to determine which of the relevant advertisements is the highest bidder for the placement. In some implementations, the auction can be based upon a bid CPM. In some implementations, the auction results can be combined with quality metrics to select an advertisement.

Once an advertisement has been selected, the competitive advertising server 130 can calculate an expected return. In those implementations using CPC to select advertisements, the expected return for the selected first network advertisement can be based upon a current CTR and the CPC for the advertisement determined through the auction process. In those implementations that use CPM to compare advertisements from a first network and a second network, the expected return for the selected first network advertisement can be based upon the bid associated with the selected first network advertisement and a CTR for the selected first network advertisement.

The competitive advertising server 130 can also identify or be provided a second network advertisement and an expected return for a second network advertisement. In some implementations, the competitive advertising server 130 can retrieve the expected return for a second network advertisement from a third-party advertisement information data store. The expected return, for example, can be provided by the publisher 140, can be calculated based upon average CPM or another performance metric provided by the publisher, or can be retrieved from the third-party provider using data received from the publisher 140. In those implementations where the second network uses a CPM performance metric, the expected return can be calculated directly from the bid.

In some implementations, the competitive advertising server 130 can retrieve the expected return for an second network advertisement from the third-party provider in substantially real-time from the third-party advertising server 160a, 160b. For example, the publisher might provide identification or authentication information to access the third-party advertising server 160a, 160b on his/her behalf. Prices retrieved in substantially real-time can provide more accurate determination of which of the advertisements yields the highest price.

The competitive advertising server 130 can compare the expected return for the first network advertisement to the expected return for the second network advertisement. In some implementations, when the expected return for the first network advertisement equals or exceeds the expected return for the second network advertisement, the competitive advertising server 130 can provide the first network advertisement to the publisher 140. If the expected return for the first network advertisement is less than the expected return for the second network advertisement by a predetermined amount (e.g., in some implementations any amount), the competitive advertising server 130 can send an ad response 220 notifying the publisher 140 that another network has a higher expected return. In some implementations, the competitive advertising server 130 can identify the second network advertisement as having the highest expected return.

In some implementations, when the second network advertisement has the highest expected return, the competitive advertising server 130 can send an ad response 220 instructing the publisher 140 to retrieve the advertisement from the third-party advertising server 160a or 160b that provides the highest return. In other implementations, the competitive advertising server 130 can send an ad response to the publisher 140 which includes the second network advertisement. In such implementations, the competitive advertising server 130 can serve as a proxy for the publisher to retrieve advertisements from the third-party advertising servers 160a, 160b. The publisher can serve the advertisement received from the competitive advertising server 130 or the third-party advertising server 160a, 160b along with the requested content 154.

Figure 3:
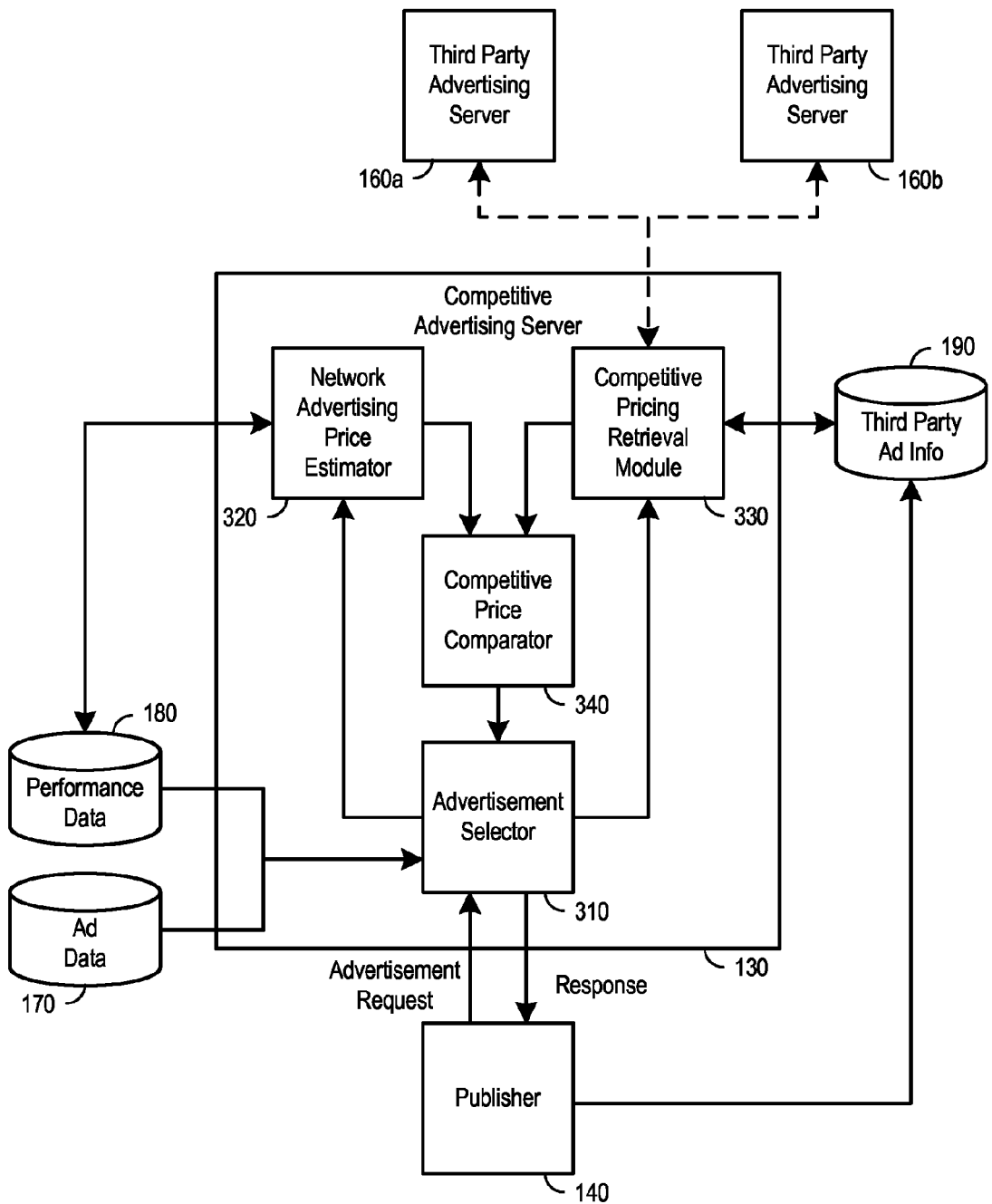
FIG. 3 is a block diagram of an example competitive advertising server.

FIG. 3 is a block diagram of an example competitive advertising server 130. The competitive advertising server 130 can include an advertisement selector 310, a network advertising price estimator 320, a competitive pricing retrieval module 330 and a competitive price comparator 340. The advertisement selector 310 can receive an advertisement request from a publisher 140. In some implementations, the advertisement selector 310 can select first network advertisements (e.g., in-network advertisements) from an advertisement data store 170. The first network advertisements can be selected, for example, based upon the relevance of keywords associated with the advertisement to the content from the publisher 140 web page or website. The keywords associated with the advertisement can be provided, for example, by the advertiser. In other examples, keywords can be identified by users choosing the keywords for the first network advertisement. The first network advertisements can also be selected based upon a quality score associated with the respective first network advertisement (e.g., using a CTR associated with the network advertisement). The advertisement selector 310 can also perform an auction to select the first network advertisement for competitive analysis.

In some implementations, the advertisement selector 310 can provide the selected first network advertisement to a network advertising price estimator 320. The first network advertising price estimator 320 can derive an expected return for the selected first network advertisement. The expected return for the first network advertisement can provide an indication of what the expected payout, on average, would be for serving the advertisement. In some implementations, the expected return can be based on an auction price for the advertisement. In additional implementations, the expected return can be based on the auction price for the advertisement and a CTR associated with the advertisement. The first network advertising price estimator 320 can provide the expected return for the selected first network advertisement to a competitive price comparator 340.

The first network advertising price estimator can also include a feedback component operable to determine how well the CTR has predicted the actual click through rate associated with the advertisement. In some implementations, when the actual CTR is less than the predicted CTR, the first network advertising price estimator 320 can provide such information to the competitive advertising server 130 such that the competitive advertising server 130 can reconcile the variance between the expected return and the actual return.

In some implementations, reconciliation of the variance between expected return and actual return can be based upon paying the publisher at least the same expected return as was retrieved for the second network advertisement associated with the highest expected return. The payment can be provided, for example, by the provider of the competitive advertising server 130 and/or the advertiser (120 of FIG. 1). In some implementations, the CPC payment can be converted to an expected CPM, whereby each publisher is provided the expected return, thereby averaging the CPC out over all of the exposures of the advertisement and ensuring that the publisher is not provided less than the expected return of any second network advertisements.

In other implementations, when the actual CTR is less than the predicted CTR, the network advertising price estimator 320 can adjust the algorithms used to derive the expected return of the first network advertisement. The algorithm can be adjusted, for example, by discounting the CTR by an amount equal to the shortfall caused by the misprediction. Other adjustments can be used.

In some implementations, the advertisement selector 310 can send a signal to the competitive pricing retrieval module 330 to notify the competitive pricing retrieval module 330 to retrieve expected return for one or more second network advertisements (e.g., one or more out-of-network advertisement). In some implementations, the competitive pricing retrieval module 330 can retrieve the expected return for second network advertisements from a third-party advertisement information data store 190. The third-party advertisement information stored in the third-party advertisement information data store 190 can be provided, for example, by the publisher 140, or can be retrieved off-line by the competitive advertising server 130. In other implementations, the competitive pricing retrieval module 330 can retrieve the expected return for second network advertisements substantially in real-time from a third-party advertising server provided by a third-party advertisement provider. The competitive pricing retrieval module 330 can provide the expected return for the second network advertisement(s) to the competitive pricing comparator 340.

In some implementations, the competitive pricing comparator 340 can compare the expected return for the first network advertisement received from the network advertising price estimator 320 and the expected return for second network advertisement(s) received from the competitive pricing retrieval module 330. The competitive pricing comparator 340 can determine, for example, if the expected return of the first network advertisement is greater than or equal to the expected return of the second network advertisement. If the expected return of the first network advertisement is greater than or equal to the expected return of the second network advertisement, the competitive pricing comparator can instruct the network advertising selector 310 to provide a response including the first network advertisement to the publisher 140. Otherwise, the competitive pricing comparator 340 can instruct the advertisement selector 310 to provide a response indicating, for example, that another network advertisement has a higher expected return.

In some implementations, the competitive pricing comparator 340 can determine which of the second network advertisements provides the highest expected return. In such implementations, the competitive pricing comparator 340 can instruct the advertisement selector 310 to provide a response including, for example, a notification of which of the second network advertisements provides the highest expected return. In some implementations, the advertisement selector 310 can serve as a proxy and can provide the second network advertisement with a highest expected return to the publisher 140. In such implementations, the advertisements selector can arbitrate between a first network and the second network, to provide an advertisement from the first network or an advertisement from the second network.

Figure 4:
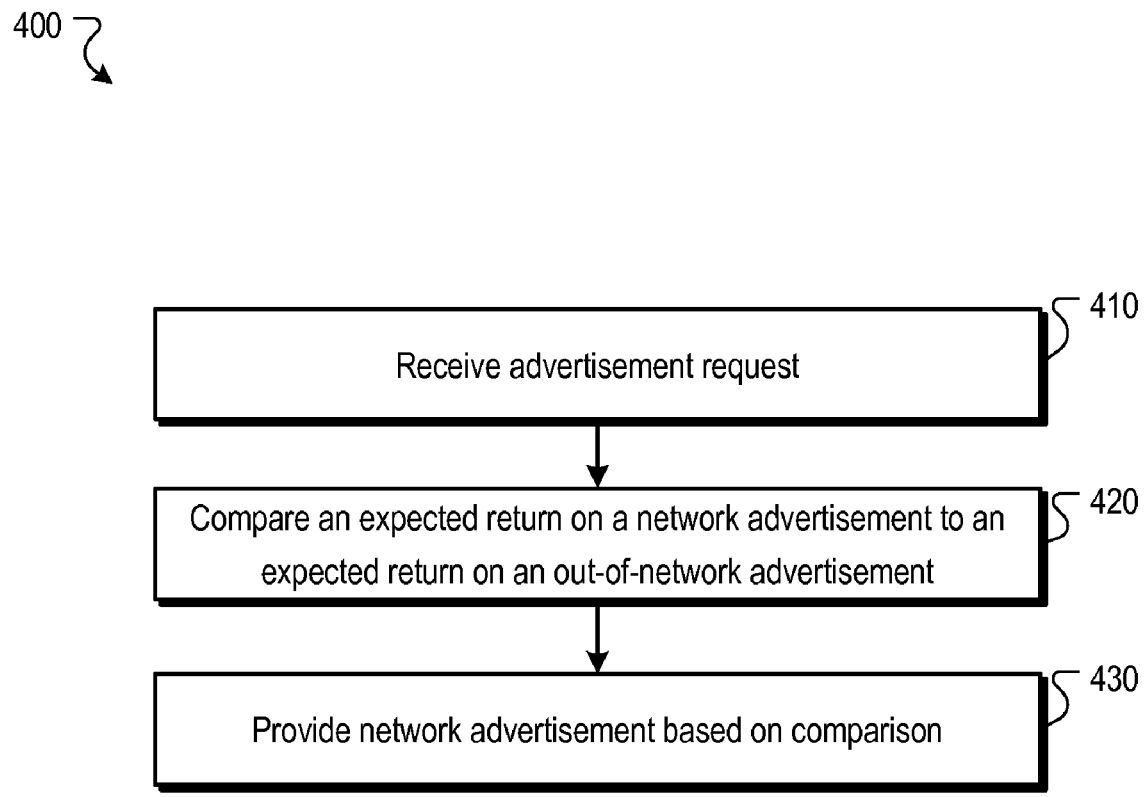
FIG. 4 is a flow diagram of an example process for competitive advertising serving.

FIG. 4 is a flow diagram of an example process 400 for competitive advertising serving. At stage 410, an advertisement request is received. The advertisement request can be received, for example, by a competitive advertising server (e.g., competitive advertising server 130 of FIG. 3) using an advertisement selector (e.g., advertisement selector 310 of FIG. 3). The advertisement request can be received, for example, from a publisher (e.g., publisher 140 of FIG. 3). In some implementations, the request can include identification of content being requested. The identification of content being requested can facilitate identification of relevant network advertisements for the publisher.

At stage 420, an expected return on a first network advertisement is compared to an expected return on a second network advertisement. The expected return on the first network advertisement can be compared to the expected return on the second network advertisement, for example, by a competitive price comparator (e.g., competitive price comparator 340 of FIG. 3). In some implementations, the expected return on the first network advertisement can be received from a network advertising price estimator (e.g., network advertising price estimator 320 of FIG. 3), and the expected return on the second network advertisement can be retrieved by a competitive pricing retrieval module (e.g., competitive pricing retrieval module 330 of FIG. 3).

At stage 430, a network advertisement can be provided based upon the comparison. The first network advertisement can be provided, for example, by an advertisement selector (e.g., advertisement selector 310 of FIG. 3). In some implementations, the first network advertisement can be provided, for example, based upon a determination that an expected return on the first network advertisement is greater than or equal to an expected return on a second network advertisement. In some implementations, notification can be provided to the publisher that a second network advertisement has the highest expected return including, for example, identification of which second network advertisement has the highest expected return.

Figure 5:
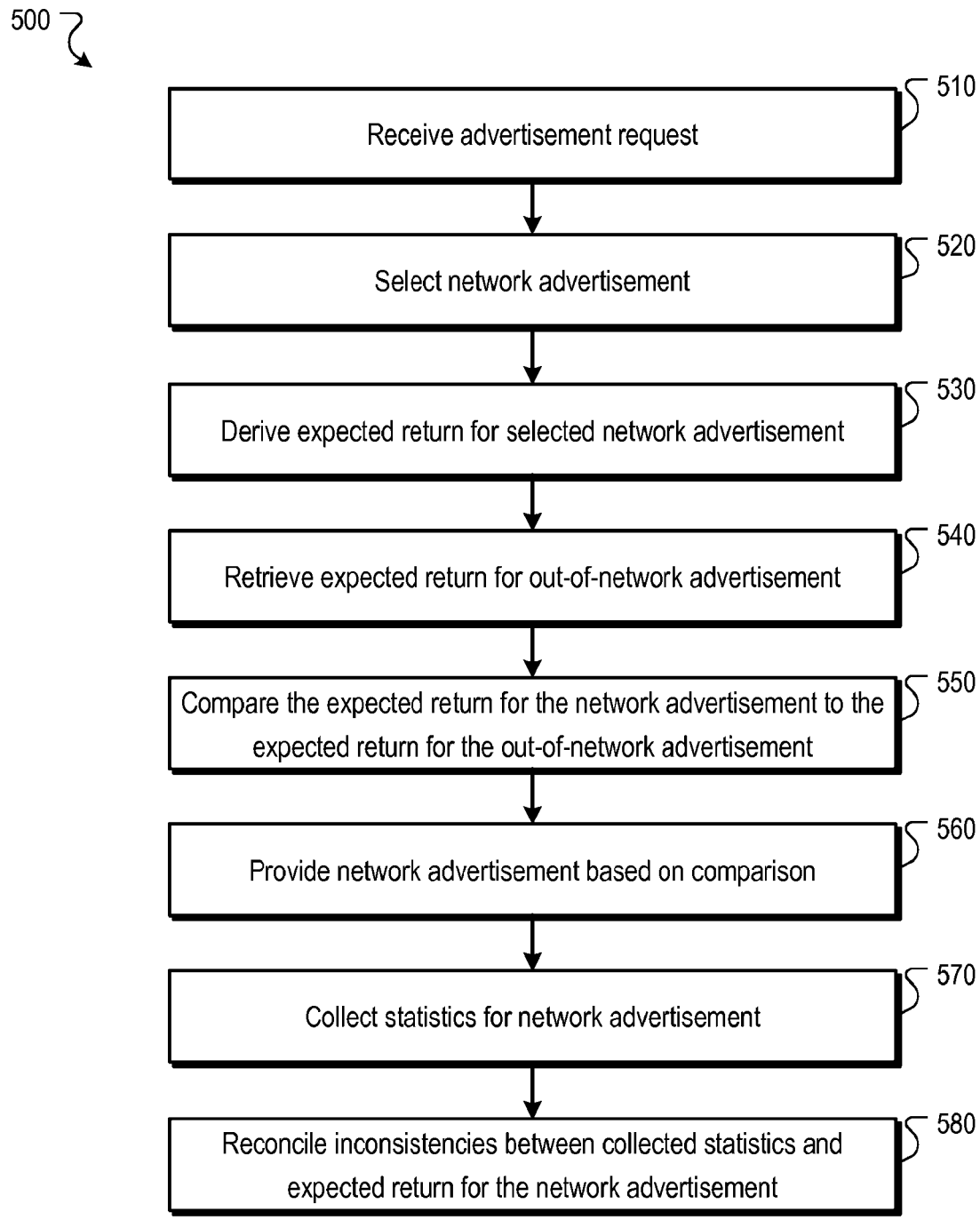
FIG. 5 is a flow diagram of another example process for competitive advertising serving.

FIG. 5 is a flow diagram of another example process 500 for competitive advertising serving. At stage 510, an advertisement request is received. The advertisement request can be received, for example, by a competitive advertising server (e.g., competitive advertising server 130 of FIG. 3) using an advertisement selector (e.g., advertisement selector 310 of FIG. 3). The advertisement request can be received, for example, from a publisher (e.g., publisher 140 of FIG. 3). In some implementations, the request can include identification of content being requested. The identification of content being requested can facilitate identification of relevant network advertisements for the publisher.

At stage 520, a network advertisement can be selected. The first network advertisement can be selected, for example, by an advertisement selector (e.g., advertisement selector 310 of FIG. 3). In various implementations, the first network advertisement can be selected for example based upon a relevance score of the advertisement to the content being served, a quality score based on a CTR associated with the advertisement, and a bid associated with the advertisement, and combinations thereof. Other methods for selecting an advertisement can be used.

At stage 530, an expected return for the first network advertisement can be derived. The expected return for the first network advertisement can be derived, for example, by a network advertising price estimator (e.g., network advertising price estimator 320 of FIG. 3). In various implementations, the expected return for the first network advertisement can be derived using any of a CTR, a CPC bid, a CPM bid, and combinations thereof. For example, if a click through rate is 1% and a CPC bid is $1.20, the expected return is $0.012.

At stage 540, an expected return for a second network advertisement can be retrieved. The expected return for the second network advertisement can be retrieved, for example, by a competitive pricing retrieval module (e.g., competitive pricing retrieval module 330 of FIG. 3). In some implementations, the expected return for the second network advertisement can be retrieved from a third-party advertisement information data store (e.g., third-party advertisement information data store 190 of FIG. 3). For example, a publisher can provide information about typical or average CPM (or CTR, etc.) data to the competitive advertising server, and the competitive advertising server can store the CPM data to a third-party advertisement information data store. In other implementations, the expected return for the second network advertisement can be retrieved from a third-party advertising server (e.g., third-party advertising server 160*a*, 160*b* of FIG. 3). For example, when a request for advertisement is received, a competitive pricing retrieval module 330 can communicate with a third-party advertising server to obtain information about a current CPM provided for the publisher.

At stage 550, an expected return on a first network advertisement is compared to an expected return on a second network advertisement. The expected return on the network advertisement can be compared to the expected return on the second network advertisement, for example, by a competitive price comparator (e.g., competitive price comparator 340 of FIG. 3). In some implementations, the expected return on the first network advertisement can be received from a network advertising price estimator (e.g., network advertising price estimator 320 of FIG. 3), and the expected return on the second network advertisement can be retrieved by a competitive pricing retrieval module (e.g., competitive pricing retrieval module 330 of FIG. 3).

At stage 560, a first network advertisement can be provided based upon the comparison. The first network advertisement can be provided, for example, by an advertisement selector (e.g., advertisement selector 310 of FIG. 3). In some implementations, the first network advertisement can be provided, for example, based upon a determination that an expected return on the first network advertisement is greater than or equal to an expected return on a second network advertisement. In some implementations, notification can be provided to the publisher that a second network advertisement has the highest expected return including, for example, identification of which second network advertisement has the highest expected return.

At stage 570, statistics for the first network advertisement are collected. Statistics for the first network advertisement can be collected, for example, by a performance data store (e.g., performance data store 180 of FIG. 3). The statistics can include, for example, an actual CTR associated with the advertisement.

At stage 580, inconsistencies between the collected statistics and the expected return can be reconciled. Inconsistencies between the collected statistics and the expected return can be reconciled, for example, by a competitive advertising server (e.g., competitive advertising server 130 of FIG. 3). In some implementations, the expected return can be compared to the actual return (e.g., based on collected statistics). The comparison can determine whether the expected return is being achieved and/or whether the first network advertisement is providing a better return (e.g., on average) than the second network advertisement would otherwise provide. In those instances where the first network advertisement is not providing a better return than the second network advertisement, the difference between the actual return and the highest expected return of the one or more second network advertisements can be supplemented by a provider and/or an advertiser associated with the advertisement that has fallen short of providing a higher return than the second network advertisements. In some implementations, the publisher can be credited with the difference between the actual return and the highest expected return of one or more second network advertisements. In other implementations, an algorithm for deriving the expected return can be modified to discount the expected return by an appropriate amount (e.g., equal to the amount of the shortfall). In some examples, the CTR can be multiplied by a discount factor, thereby adjusting an effective click through rate which is used to provide the expected return for the first network advertisement.

The competitive advertisement server can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The competitive advertisement server 130 can be distributively implemented over a network, such as a server farm, or can be implemented in a single computer device.

Although example processing systems have been generally described, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed:

1. A computer implemented method comprising:
   receiving a request for a content item, the request being associated with a publisher
   determining, by one or more processors, whether a first expected return on a first network content item provided by a first content delivery service is greater than or equal to one or more second expected returns on one or more second network content items provided by a second different content delivery service; and
   in response to the first expected return being greater than or equal to a highest of the one or more second expected returns:
      providing the first network content item to the publisher;
   determining, by one or more processors, whether an actual return associated with the first network content item is less than the highest of the one or more second expected returns on the one or more second network content items that were not provided to the publisher; and
   in response to determining that the actual return for the first network content item is less than the highest of the one or more second expected returns:
      crediting the publisher with an amount equal to or greater than a calculated difference between the actual return for the first network content item and the highest of the one or more second expected returns.

2. The computer implemented method of claim 1, further comprising:
   in response to the first expected return being less than a second expected return on a second network content item of the one or more second network content items:
      providing the second network content item to the publisher.

3. The computer implemented method of claim 2, further comprising retrieving the second expected return on the second network content item.

4. The computer implemented method of claim 3, further comprising receiving the second expected return on the second network content item from the publisher.

5. The computer implemented method of claim 3, further comprising receiving the second expected return on the second network content item from a third-party provider of the second network content item.

6. The computer implemented method of claim 2, further comprising:

retrieving the second expected return on the second network content item from a third-party provider in real-time while the request is being processed.

7. The computer implemented method of claim 1, further comprising estimating the first expected return using an estimation algorithm, the estimation algorithm using previous click through rates associated with the first network content item.

8. The computer implemented method of claim 7, further comprising:
collecting statistics associated with the first network content item;
determining whether an actual return associated with the first network content item is less than the first expected return on the first network content item; and
in response to determining that the actual return associated with the first network content item is less than the first expected return on the first network content item:
adjusting the estimation algorithm used to estimate the first expected return.

9. The computer implemented method of claim 8, wherein adjusting the estimation algorithm comprises discounting the first expected return produced by the estimation algorithm.

10. The computer implemented method of claim 2, further comprising:
in response to the first expected return being less than the second expected return:
instructing the publisher to request the second network content item from a third-party provider.

11. The computer implemented method of claim 1, wherein the content item is an advertisement.

12. A computer-readable medium having stored thereon instructions, which, when executed by one or more processors, causes the one or more processors to perform the operations of:
receiving a request for a content item, the request being associated with a publisher
determining whether a first expected return on a first network content item provided by a first content delivery service is greater than or equal to one or more second expected returns on one or more second network content items provided by a second different content delivery service; and
in response to the first expected return being greater than or equal to a highest of the one or more second expected returns:
providing the first network content item to the publisher;
determining whether an actual return associated with the first network content item is less than the highest of the one or more second expected returns on the one or more second network content items that were not provided to the publisher; and
in response to determining that the actual return for the first network content item is less than the highest of the one or more second expected returns:
crediting the publisher with an amount equal to or greater than a calculated difference between the actual return for the first network content item and the highest of the one or more second expected returns.

13. The computer-readable medium of claim 12, further operable to cause the one or more processors to perform operations comprising retrieving a second expected return on a second network content item of the one or more second network content items.

14. The computer-readable medium of claim 13, further operable to cause the one or more processors to perform operations comprising receiving the second expected return on the second network content item from the publisher.

15. The computer-readable medium of claim 13, further operable to cause the one or more processors to perform operations comprising receiving the second expected return on the second network content item from a third-party provider.

16. The computer-readable medium of claim 13, further operable to cause the one or more processors to perform operations comprising retrieving the second expected return on the second network content item from a third-party provider in real-time while the request for the content item is being processed.

17. The computer-readable medium of claim 12, further operable to cause the one or more processors to perform operations comprising estimating the first expected return using an estimation algorithm, the estimation algorithm using previous click through rates associated with the first network content item.

18. The computer-readable medium of claim 17, further operable to cause the one or more processors to perform operations comprising:
collecting statistics associated with the first network content item;
determining whether an actual return associated with the first network content item is less than the first expected return on the first network content item; and
in response to determining that the actual return is less than the first expected return:
adjusting the estimation algorithm used to estimate the first expected return.

19. The computer-readable medium of claim 18, wherein adjusting the estimation algorithm comprises discounting the first expected return produced by the estimation algorithm.

20. The computer-readable medium of claim 12, further operable to cause the one or more processors to perform operations comprising:
in response to the first expected return being less than a second expected return on a second network content item of the one or more second network content items:
providing the second network content item to the publisher.

21. The computer-readable medium of claim 20, further operable to cause the one or more processors to perform operations comprising:
in response to the first expected return being less than the second expected return:
instructing the publisher to request the second network content from a third-party provider.

22. The computer-readable medium of claim 12, wherein the content item is an advertisement.

* * * * *

UNITED STATES PATENT AND TRADEMARK OFFICE
CERTIFICATE OF CORRECTION

| | | |
|---|---|---|
| PATENT NO. | : 8,103,544 B2 | Page 1 of 1 |
| APPLICATION NO. | : 12/195688 | |
| DATED | : January 24, 2012 | |
| INVENTOR(S) | : Bhavesh R. Mehta | |

It is certified that error appears in the above-identified patent and that said Letters Patent is hereby corrected as shown below:

In Claim 1, Line 22, Column 14, delete "method" and insert -- method, --, therefor.

In Claim 1, Line 24, Column 14, delete "publisher" and insert -- publisher; --, therefor.

In Claim 12, Line 39, Column 15, delete "publisher" and insert -- publisher; --, therefor.

Signed and Sealed this
Seventeenth Day of April, 2012

David J. Kappos
*Director of the United States Patent and Trademark Office*